United States Patent [19]
Alston et al.

[11] Patent Number: 5,270,089
[45] Date of Patent: Dec. 14, 1993

[54] FLUID ABSORBING SYSTEM

[76] Inventors: Timothy E. Alston, 1023 Pickard Rd., Sanford, N.C. 27330; Eric E. Alston, 790 N. Cedar Bluff Rd., Knoxville, Tenn. 37923

[21] Appl. No.: 874,964

[22] Filed: Aug. 10, 1992

[51] Int. Cl.$^5$ .............................................. B32B 3/10
[52] U.S. Cl. .................................... 428/60; 428/120; 428/138; 428/179; 15/215
[58] Field of Search ................. 428/81, 120, 179, 138, 428/60; 296/38; 15/215, 216; 180/69.1

Primary Examiner—Alexander S. Thomas
Attorney, Agent, or Firm—John G. Mills & Associates

[57] ABSTRACT

This invention is an fluid absorbing means wherein an integral grid of inverted, semi-conical projections or fingers with rounded upper ends is provided. This grid can be walked on while preventing oil or other liquids which are dripped, spilled or otherwise deposited thereon from coming into contact with the soles of the user's shoes. Openings are provided at the juncture of the inverted, semi-conical fingers so that the contaminating fluid can pass therethrough onto an absorbing mat disposed thereto. This absorbing mat can be formed from cotton fiber, polymer material, polyethylene sponge, cellulose fiber or other suitable material or a combination thereof. A housing means completely surrounds the grid and its underlying absorbing material and includes an integral bottom to contain the contaminating fluids should the absorbing material become saturated. Wing-like curb markers can be attached to the housing if desired to act as a guide if the fluid absorbing system of the present invention is used in conjunction with parked vehicles.

16 Claims, 2 Drawing Sheets

FLUID ABSORBING SYSTEM

FIELD OF INVENTION

T relates to a means for collecting spilled fluids while allowing users to walk thereon without getting their shoes contaminated with such fluid.

BACKGROUND OF INVENTION

In the past the spillage of fluids on surfaces, particularly surfaces that are in high traffic areas, has been a problem. The spillage, if not cleaned up, can be tracked into other areas thereby further spreading the same. This not only can soil and contaminate adjacent surface areas, but in the case of low friction coefficient fluids, can be very dangerous by causing people to slip and fall.

A few examples of undesirable spillages are around sinks in restaurant kitchens, in garages where oil and other lubricants leak from engines, transmissions and the like, and in industrial environments where the work floors around machinery are covered with oil used in manufacturing processes such as metal lathes, drilling machines and the like.

To counteract these problems, absorbent materials such as sawdust or specially formulated granular materials are spread over the effected area. Although this method of spillage cleanup will remove some of the liquid, stains, particularly from oils and lubricants, will remain and the disruption caused by having to spread the absorbent material and then sweep the same up is a problem. This is particularly true in manufacturing areas where workers are still having to operate equipment during the clean up process. Also, this method is effective only when used in conjunction with small liquid spills and other methods such as mopping, squeegeeing, and the like must be used when larger spills are encountered.

Drip pans have been utilized in limited areas such as under parked vehicles, but again, this is of only limited use since, when the vehicle is moved, the pan is exposed and can be tripped over or stepped in by careless individuals thus causing the fluid in the pan to be either spilled or tracked.

Absorbent mats have been utilized and some have even had grids disposed over the same. This is an inadequate method of controlling waste fluids since stepping on absorbent material will squeeze the fluid out onto the shoes of the person walking thereon and the grids disposed thereabove can still be covered with fluids, particularly oil and grease, and will still contaminate the shoes of the person walking thereon.

BRIEF DESCRIPTION OF INVENTION

After much research and study into the above mentioned problems, the present invention has been developed to provide a fluid absorbing means which gives good traction when walked on, will not accumulate on its upper surface contaminating fluids which can be tracked when walked on, and which will absorb large amounts of spillage.

This is accomplished through the provision of a grid made up of a plurality of integrally formed, inverted, semi-cylindrical protrusions that are rounded on their upper ends with openings formed at the juncture of each of said protrusions to allow fluids to pass therethrough. This grid is placed in a container that has an open top and includes peripheral walls that are sloped upwardly and inwardly with a fluid impervious bottom secured or integrally formed into said walls. A material with high fluid absorption capability is placed in the bottom of the container with the grid mounted thereabove.

The above forms a mat-like means that will allow liquid or fluid spillages to pass through the grid and be absorbed into the absorbable material without leaving a residue on the upper surfaces of such grid. Thus the grid gives good traction and does not contaminate the shoes of the persons walking thereon. The gently sloping sides also prevent people from stumbling over the mat or falling when they step off the edge thereof.

Should the absorbing material become saturated, overflow still will not occur since the height of the peripheral wall extends above the top surface of said absorbent material.

The grid portion of the present invention is readily removable so that the absorbent material can be replaced and yet is secured to the peripheral wall or housing when in use to prevent shifting or tipping when weight is placed thereon.

DISCUSSION OF PRIOR ART

U.S. Pat. No. 4,497,147 to Clapper relates to a drip catching mat for garage floors and the like wherein an absorbent oleophilic blotter member is contained within a base member that is bonded to the floor. Once oil or other fluids have dripped on this device, if a person should step thereon, the fluid would be squeezed out onto the shoes of such person. Also the edges of the base member are perpendicular to the floor so that a person could easily trip thereover. Both of these problems are, of course, eliminated in the present invention.

U.S. Pat. No. 4,798,754 to Tomek discloses an oil absorbent floor mat which is designed to be placed beneath vehicles or adjacent machines and includes multiple layers of paper contained within a plastic housing. This housing has flat areas on the top thereof so that a person walking thereon would still contaminate the soles of his or her shoes. Also this Patent does not eliminate the problem of a user stumbling thereover which, of course, the present invention has addressed.

U.S. Pat. No. 5,001,007 to Kenimer discloses an absorbent, replenishable garage mat made of semi-rigid material with standard newspapers being disposed therein as absorbent material. A mesh cover is also included, but again, this would hold contaminated spillage on its upper surface that can be tracked if a person walks thereon. Although the sides of this invention curve upwardly, this is for aesthetics rather than functionality and the upper portion of the curved sides are almost vertical thus providing a surface that can be readily tripped over.

Finally, U.S. Pat. No. 3,195,683 to Peterson et al discloses a method and device of oil collection and disposal which includes a frame with absorbent material therein with a mesh thereover. This device is adapted to burn off the oil collected therein which, of course, would not be allowable under today's environmental regulations. Also, this device can readily be tripped over and would contaminate the soles of the shoes of any one who happened to walk thereon.

OBJECTS OF INVENTION

In view of the above, it is an object of the present invention to provide a fluid or liquid absorbing means which provides a slip resistant surface that can be walked on but will not contaminate the soles of the shoes of the user thereof.

Another object of the present invention is to provide a highly absorbent spilled liquid accumulating means that does not pose a threat as a stumbling block.

Another object of the present invention is to provide a peripheral housing having an integral bottom for containing an absorbing material with a porous grid mounted thereabove to allow spillages to pass therethrough without accumulating surface contaminants thereon thus allow the same to be walked on in a soil free manner.

Another object of the present invention is to provide at least one guide means for mounting on a liquid absorbing means so that such absorbing means can readily be located beneath the engine and/or transmission of a vehicle.

Another object of the present invention is to provide a pair of wing-like guides which can be readily attached to a liquid absorbing means so a vehicle can be steered over such absorbing means.

Another object of the present invention is to provide a liquid absorbing means including an integral grid of inverted, semi-conical projections with rounded upper ends to prevent deposited spillages from accumulating thereon that might contaminate the shoes of a person walking on such grid.

Other objects and advantages of the present invention will become apparent and obvious from a study of the follow description and accompanying drawings which are merely illustrative of such invention.

DETAILED DESCRIPTION OF INVENTION

Figure 1:
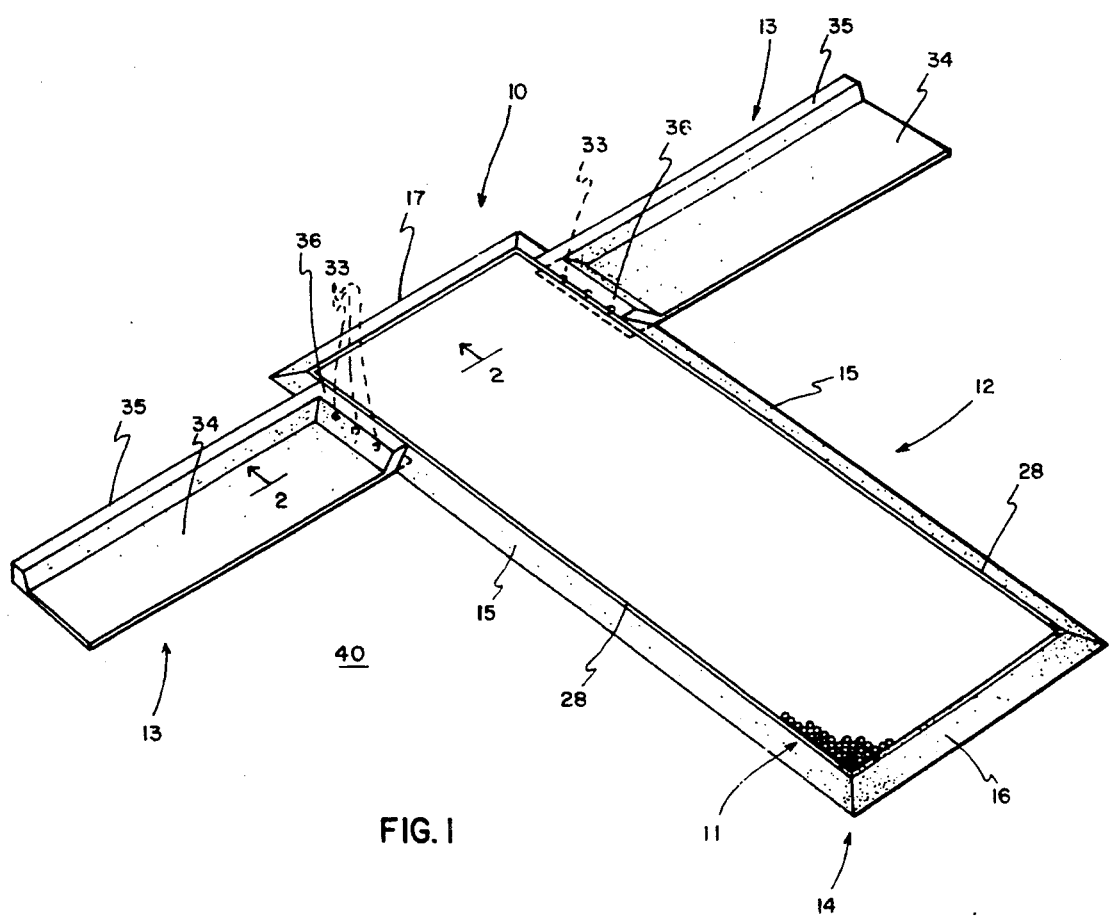
FIG. 1 is a perspective view of the fluid absorbing means of the present invention with the pair of vehicle guides mounted thereon.

With further reference to the drawings, the fluid absorbing means of the present invention, indicated generally at 10, includes a grid of integral cones, indicated generally at 11, and a recepticle indicated generally at 12. A pair of guide means, indicated generally at 13, are also provided and are adapted to be removably mounted on opposite sides of receptacle 12 as can clearly be seen in FIG. 1.

The receptacle 12 is preferably formed in one piece through a molding process and is made from a suitable plastic or rubber type material. This receptacle includes, indicated generally at 14 peripheral walls that gradually slope upwardly and inwardly in shape at an angle of approximately 35°. These peripheral walls include a pair of parallely disposed side walls 15, a rear wall 16, and a front wall 17. A generally flat bottom 18 is provided with a lip or raised portion 19 which is provided about the periphery thereof.

A fluid absorbing mat 20 formed from a suitable material such as cotton fiber, polymer material, polyethylene sponge, cellulose fiber or the like is provided. This mat lies juxtapose to bottom 18 and lies adjacent the vertical edge 21 of peripheral lip 19.

Figure 3:
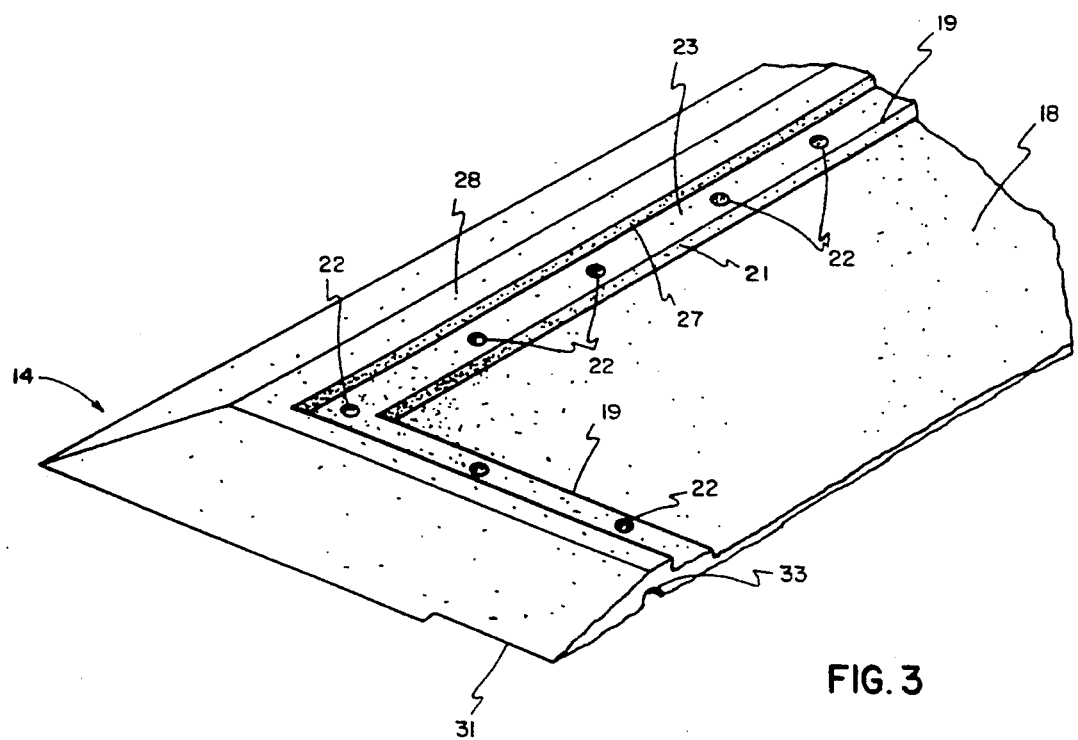
FIG. 3 is a cutaway perspective view of the peripheral walls and fluid retaining bottom of the present invention.
Figure 4:
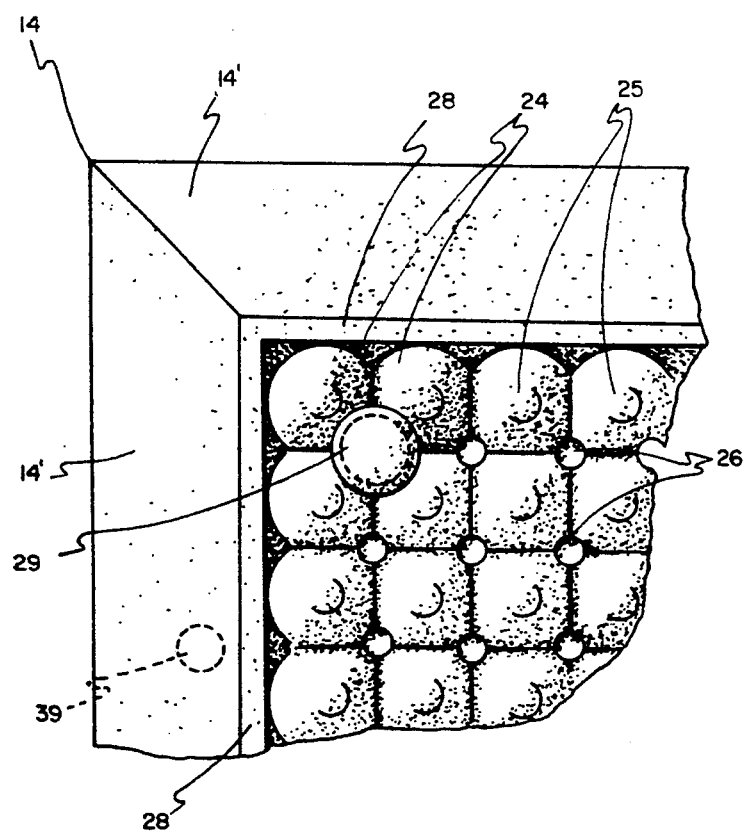
FIG. 4 is a cutaway top plan view of the fluid absorbing means of the present invention.

A plurality of openings 22 are provided in the horizontal surface 23 of peripheral lip 19 as can clearly be seen in FIG. 3.

The grid of inverted cones 11 is integrally formed from a suitable plastic or rubber type material. This grid includes a plurality of inverted, cone-like projections 24 whose upper ends are rounded as indicated at 25. Each of these cones is integrally formed or molded into its adjacent cones to form said grid.

At the juncture of each of the cones is a drain hole or opening 26 which allows fluids that are spilled on the grid 11 to pass therethrough to be absorbed in fluid absorbing mat 20.

The rounded upper ends 25 of cone-like projections 24 prevent accumulations of liquids thereon since fluids will flow off of non-flat, rounded surfaces due to the forces of gravity acting on such fluids. The upper portions of the cones being rounded also allows the same to be walked on without punching through the soles of the shoes of the person walking thereon as sharp conical ends would.

Figure 2:
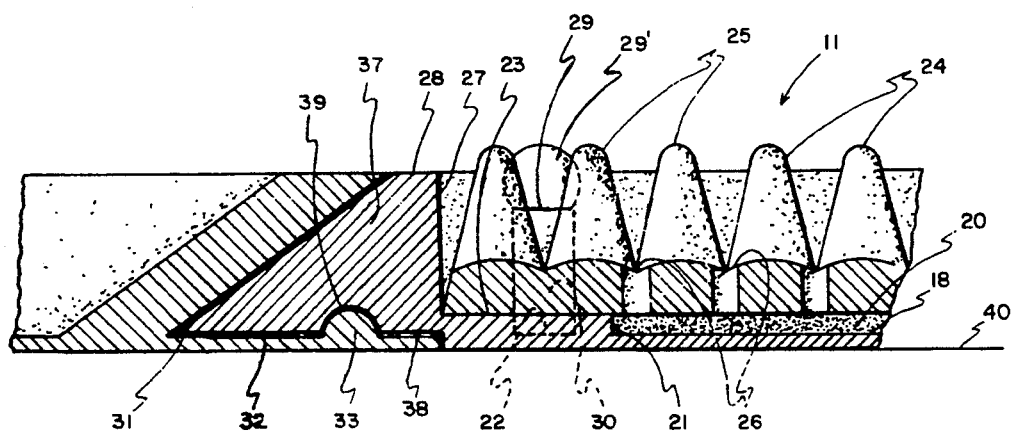
FIG. 2 is a sectional view taken through lines 2—2 of FIG. 1.

The grid 11 is adapted to rest on the horizontal surface 23 of peripheral lip 19 and juxtapose to the underlying absorbent mat 20 as can clearly be seen in FIG. 2. The grid 11 also lies adjacent the vertical interior wall 27 of peripheral wall 14, again, as can clearly be seen in FIG. 2.

The upper surface of peripheral wall 14 is generally flat and horizontal, as indicated at 28, so that there is not a sharp edge that might damage the soles of the shoes of the person walking thereon.

A plurality of grid locking tabs 29 are provided and pass through openings 30 in grid 11 and into openings 22 of peripheral lip 19 to lock such grid in place within the fluid absorbing means 10 of the present invention.

A slot-like opening 31 is provided in each of the side walls 15 in the area adjacent front wall 17. On the flat underside 32 of slot-like opening 31 is provided one or more dimple-like openings or depressions 33 as can be seen in FIGS. 2 and 3.

The guide means 13 are integrally formed preferably from a molding process from a suitable type of plastic or rubber material. These wing-like guides include a slightly tapered from rear to front bottom portion 34 and a raised wall-like wheel stop 35. The ends 36 of guide means 13 that are adapted to be disposed adjacent respective parallel side walls 15 are sloped upwardly at an angle parallel to the sloping peripheral walls 14.

A slot like opening 37 that is generally triangular in cross section is provided in end portion 36 with the lower portion thereof forming a lip 38 as can clearly be seen in FIGS. 2 and 3.

One or more semi-spherical protrusions 39 are provided on the upper surface of lip 38. These protrusions are adapted to lockingly engage dimples 33 of side wall 15 as can clearly be seen in FIG. 2.

Since the wheel guides 35 are made of a plastic or rubber like material including the respective lips 38, there is some resilience in such lip which allows it to be deflected enough to slide into the locking engagement shown in FIG. 2.

To use the fluid absorbing means of the present invention, a liquid or fluid absorbing material 20 is placed on the bottom 18. The inverted cone grid 11 is then placed over the absorbing material so that it rests on the horizonal surface 23 of peripheral lip 19. The grid locking pins or tabs 29 are then pushed down through the tab openings 30 and into engagement with aligned openings 22 in peripheral lip 19.

The fluid absorbing means 10 of the present invention can now be moved or placed in its use position, whether it be below the engine and/or transmission of a vehicle, next to the sink in a restaurant, beside operating manufacturing equipment, or other locations where it is desirable to collect and contain spillages.

If the fluid absorbing means 10 of the present invention is to be placed under a vehicle, the guide means 13 can be connected thereto. This is accomplished by sliding the lip 38 of guide 13 into slot-like opening 31 of each of the side walls 15 until the semi-spherical protrusions 39 come into locking engagement with associated dimples 33 in the flat underside 32 of said side walls. The underlying floor will effectively maintain the lock between the two parts.

The driver of the leaking vehicle (not shown) can then maneuver the same so that the tires roll up on to the bottom 34 of the guides 13 and into engagement with the wall-like stops 35.

Whenever it becomes desirable to remove the wing-like guides 13 from the side walls 15, the absorbing means 10 of the present invention is simply raised off of the floor or supporting surface 40 and the lips 38 of the guides deflected downwardly until protrusions 39 disengage dimples 33. At this point the guides 13 can be removed from their respectives wall 15.

Whenever the absorbing material 20 becomes saturated with fluid, the rounded head portions 29' of locking pin or tabs 29 are grasped and pulled vertically so that they disengage their respective openings 22 in peripheral lip 19. Once this is done the inverted cone grid 11 can be lifted from the absorbing means 10 of the present invention to expose the absorbing material or mat 20. This material can then be removed for proper disposal. A new mat can then be placed in the means of the present invention to replace the one just removed. The grid is then replaced on the peripheral lip 19 and the locking tabs 29 again push down into engagement with openings 22. The system is now ready for continued use.

The above can be accomplished regardless of whether the guide means 13 are connected or disconnected. Also the changing of the absorbent material can be accomplished without moving the underlying structure.

In view of the above it is obvious that the present invention provides a superior method of collecting waste or spilled fluids while at the same time providing a walkway that is virtually free from said fluid materials thus not contaminating adjacent areas.

This can be accomplished either with or without the readily attachable and detachable guide means.

The terms "upper", "lower", "side", "vertical", "horizontal" and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such inventions. The present embodiments are, therefore, to be considered in all respects as illustrative and not restrictive, and all changes coming within the meaning and equivalency range of the appended claims are intended to be embraced therein.

What is claimed is:

1. A means for recovering waste fluids from defined areas while allowing said areas to be transversed comprising: an open top receptacle having peripheral sides and a bottom; an absorbent material disposed in an area adjacent the bottom of said receptacle; a grid formed from a plurality of interconnected, inverted, cone-like projections having their upper ends rounded in vertical cross section and having a plurality of generally, vertically disposed openings therein; and means supporting said grid above said absorbing material whereby waste fluids can pass through the grid and be absorbed by the absorbing material while the rounded ends of the cone-like projections will support users walking thereon, but due to such rounded areas, fluids do not remain thereon that might contaminate the bottoms of the shoes of said user.

2. The means of claim 1 wherein the exterior walls of said peripheral sides gently slope upwardly and inwardly.

3. The means of claim 2 wherein the angle of slope of said side walls is approximately 35 degrees from horizontal.

4. The means of claim 1 wherein the peripheral sides and bottom are integral.

5. The means of claim 1 wherein the absorbing material is mat-like in configuration and is formed from material selected from the group consisting of cotton fiber, polymer material, and cellulose fiber.

6. The means of claim 1 wherein the absorbent material is formed from a combination selected from the group consisting of cotton fiber, polymer material, polyethelene sponge and cellulose fiber.

7. The means of claim 1 wherein said grid is integrally formed into a plurality of inverted cone-like projections having rounded upper ends.

8. The means of claim 1 wherein the generally vertically disposed openings in said grid are formed at the junctions where the cones meet.

9. The means of claim 1 wherein the means for supporting said grid above said absorbing material is a peripheral lip that rises above said bottom.

10. The means of claim 9 wherein a plurality of openings are provided in said peripheral lip for engaging a plurality of downwardly projecting locking tabs whereby said grid can be locked in place relative to said receptacle.

11. The means of claim 1 wherein at least one elongated guide means is attached to the peripheral side of said receptacle whereby proper alignment of a vehicle above the means for recovering waste fluids can be accomplished.

12. The means of claim 11 wherein at least two guide means are provided on opposite sides of said receptacle.

13. The means of claim 1 wherein at least one slot-like opening is formed in the lower, outer portion of said peripheral sides with at least one dimple formed in the lower surface of said peripheral sides and within said slot-like opening; and a guide means having an opening in one end thereof formed by a lip with at least one semi spherical projection thereon for mating engage with said peripheral sides and said slot-like opening with said projection engaging said dimple whereby said guide means can be held in place relative to said peripheral sides.

14. The means of claim 1 wherein said receptacle is molded from a plastic or rubber-like material.

15. The means of claim 1 wherein said grid is molded from a plastic or rubber-like material.

16. The means of claim 11 wherein said guide means is molded from a plastic or rubber-like material.

* * * * *